(12) United States Patent
Call et al.

(10) Patent No.: US 8,700,951 B1
(45) Date of Patent: Apr. 15, 2014

(54) SYSTEM AND METHOD FOR IMPROVING A DATA REDUNDANCY SCHEME IN A SOLID STATE SUBSYSTEM WITH ADDITIONAL METADATA

(75) Inventors: Matthew Call, Ladera Ranch, CA (US); John A. Morrison, Fort Collins, CO (US); Lan D. Phan, Garden Grove, CA (US); Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 428 days.

(21) Appl. No.: 13/044,400

(22) Filed: Mar. 9, 2011

(51) Int. Cl.
G06F 11/08 (2006.01)

(52) U.S. Cl.
USPC ........... 714/6.24; 714/6.11; 714/6.22; 714/22

(58) Field of Classification Search
USPC ................................. 714/6.22, 6.24, 22, 6.11
See application file for complete search history.

(56) References Cited

U.S. PATENT DOCUMENTS

| | | | |
|---|---|---|---|
| 5,408,644 A * | 4/1995 | Schneider et al. ................. | 714/1 |
| 5,499,337 A | 3/1996 | Gordon | |
| 6,467,022 B1 | 10/2002 | Buckland et al. | |
| 6,523,087 B2 | 2/2003 | Busser | |
| 6,959,413 B2 | 10/2005 | Humlicek et al. | |
| 7,069,382 B2 | 6/2006 | Horn et al. | |
| 7,200,715 B2 | 4/2007 | Kleiman et al. | |
| 7,409,492 B2 | 8/2008 | Tanaka et al. | |
| 7,640,390 B2 | 12/2009 | Iwamura et al. | |
| 7,653,778 B2 | 1/2010 | Merry, Jr. et al. | |
| 7,779,294 B2 | 8/2010 | Corrado et al. | |
| 7,856,528 B1 | 12/2010 | Frost et al. | |
| 8,321,597 B2 | 11/2012 | Yu et al. | |
| 8,402,217 B2 | 3/2013 | Burd | |
| 2004/0015657 A1 * | 1/2004 | Humlicek et al. ............ | 711/114 |
| 2004/0123032 A1 | 6/2004 | Talagala et al. | |
| 2005/0066124 A1 * | 3/2005 | Horn et al. ..................... | 711/114 |
| 2005/0086429 A1 * | 4/2005 | Chatterjee et al. ............ | 711/114 |
| 2005/0177672 A1 * | 8/2005 | Rao .................................. | 711/3 |
| 2006/0004957 A1 | 1/2006 | Hand, III et al. | |
| 2006/0236029 A1 * | 10/2006 | Corrado et al. ............... | 711/114 |
| 2007/0268905 A1 * | 11/2007 | Baker et al. ..................... | 370/392 |
| 2007/0283079 A1 * | 12/2007 | Iwamura et al. .............. | 711/103 |
| 2007/0294565 A1 | 12/2007 | Johnston et al. | |
| 2007/0297265 A1 * | 12/2007 | Kim et al. ................ | 365/230.03 |
| 2008/0133969 A1 | 6/2008 | Manoj | |
| 2008/0141054 A1 | 6/2008 | Danilak | |

(Continued)

FOREIGN PATENT DOCUMENTS

WO    WO 2010049928 A1    5/2010

*Primary Examiner* — Chae Ko

(57) ABSTRACT

In one embodiment of the invention, a flash-based/solid-state storage system with an implemented data redundancy scheme such as RAID is configured to hold parity data in a volatile memory such as RAM and write such parity data to the non-volatile flash media when a full stripe of data has been written to the media. Other embodiments in certain situations force an early write of the parity for a partial stripe that has not been fully written to the non-volatile media. Those situations may include a data access error on data in a partial stripe and a detected power loss event with a partial stripe present. Embodiments are directed to writing additional data with the parity data for the partial stripe and then later using the additional data in data recovery. This approach allows the controller to easily detect the presence of a partial stripe and handle such a stripe accordingly.

21 Claims, 6 Drawing Sheets

(56) References Cited

U.S. PATENT DOCUMENTS

| | | |
|---|---|---|
| 2008/0155160 A1 | 6/2008 | McDaniel |
| 2008/0229148 A1* | 9/2008 | Forhan et al. .................... 714/15 |
| 2008/0276124 A1* | 11/2008 | Hetzler et al. ..................... 714/6 |
| 2009/0073762 A1* | 3/2009 | Lee et al. .................. 365/185.03 |
| 2009/0083504 A1* | 3/2009 | Belluomini et al. ........... 711/162 |
| 2009/0150599 A1* | 6/2009 | Bennett .......................... 711/103 |
| 2009/0172335 A1* | 7/2009 | Kulkarni et al. .............. 711/170 |
| 2009/0204852 A1 | 8/2009 | Diggs et al. |
| 2009/0210744 A1* | 8/2009 | Kamalavannan ................ 714/20 |
| 2009/0248998 A1 | 10/2009 | Sato et al. |
| 2009/0327604 A1 | 12/2009 | Sato et al. |
| 2009/0327803 A1 | 12/2009 | Fukutomi et al. |
| 2010/0049914 A1 | 2/2010 | Goodwin |
| 2010/0064111 A1 | 3/2010 | Kunimatsu et al. |
| 2010/0088557 A1 | 4/2010 | Weingarten et al. |
| 2010/0088579 A1* | 4/2010 | Hafner et al. ................. 714/807 |
| 2010/0115175 A9 | 5/2010 | Zhuang et al. |
| 2010/0122115 A1 | 5/2010 | Olster |
| 2010/0169543 A1* | 7/2010 | Edgington et al. ............. 711/103 |
| 2010/0262773 A1* | 10/2010 | Borchers et al. ............... 711/114 |
| 2010/0281202 A1 | 11/2010 | Abali et al. |
| 2011/0035548 A1 | 2/2011 | Kimmel et al. |
| 2011/0126045 A1 | 5/2011 | Bennett |
| 2011/0173484 A1 | 7/2011 | Schuette et al. |
| 2011/0191649 A1* | 8/2011 | Lim et al. ....................... 714/752 |
| 2011/0219259 A1 | 9/2011 | Frost et al. |
| 2011/0264843 A1 | 10/2011 | Haines et al. |
| 2011/0314218 A1* | 12/2011 | Bert ............................... 711/114 |
| 2012/0079318 A1 | 3/2012 | Colgrove et al. |
| 2012/0110376 A1 | 5/2012 | Dreifus et al. |
| 2012/0151253 A1* | 6/2012 | Horn ............................ 714/6.22 |
| 2012/0173790 A1 | 7/2012 | Hetzler et al. |
| 2012/0233406 A1 | 9/2012 | Igashira et al. |
| 2012/0246403 A1 | 9/2012 | McHale et al. |

* cited by examiner

SYSTEM AND METHOD FOR IMPROVING A DATA REDUNDANCY SCHEME IN A SOLID STATE SUBSYSTEM WITH ADDITIONAL METADATA

BACKGROUND

Many data storage components such as hard disks and solid state drives have certain advertised reliability guarantees that the manufacturers provide to customers. For example, certain solid state drive manufacturers guarantee a drive failure rate of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups providing mirroring and/or error checking mechanisms. For example, various memory pages/blocks of a solid state storage device may be combined into data stripes in which user data is stored.

BRIEF DESCRIPTION OF THE DRAWINGS

Systems and methods which embody the various features of the invention will now be described with reference to the following drawings, in which.

DETAILED DESCRIPTION OF SPECIFIC EMBODIMENTS

Overview

A common approach to overcome storage element failure is to use redundant RAID (mirroring, parity, etc.) to allow data recovery should one or more failures (e.g., a read failure) occur. Typically, a target number of storage elements (e.g., pages, blocks, etc.) per stripe is chosen to achieve a desired reliability at a given cost in storage overhead. In one embodiment of the present invention, a flash-based/solid-state storage system is configured to hold parity data in a temporary volatile memory such as RAM (Random Access Memory) and write such parity data to the non-volatile flash media when the full stripe's worth of data has been written to the non-volatile flash media.

However, there are situations when the parity for an open stripe is written to the flash media before the stripe is fully written. (Since the writing of the parity data "closes" a stripe, a stripe prior to the writing of its parity data is said to be an "open" stripe.) For example, in various embodiments of the invention, it may be appropriate to force a write of the parity data associated with an open stripe upon the detection of an uncorrectable data access error (e.g., a read or program error) on data in the stripe. In another example, the parity data may be written to the flash media when there is a detected power loss event and an open stripe present. Whatever the original cause that may have triggered the early write of parity data, embodiments of the invention are directed to writing additional data with the parity data to the flash media and then later using the additional data in data recovery operations. This approach allows the storage subsystem to easily detect the presence of a partial stripe and handle such a stripe accordingly. In one embodiment, the additional data is written in a spare area that is typically reserved for various system metadata and is used to indicate validity of pages in the partial stripe.

System Overview

Figure 1:
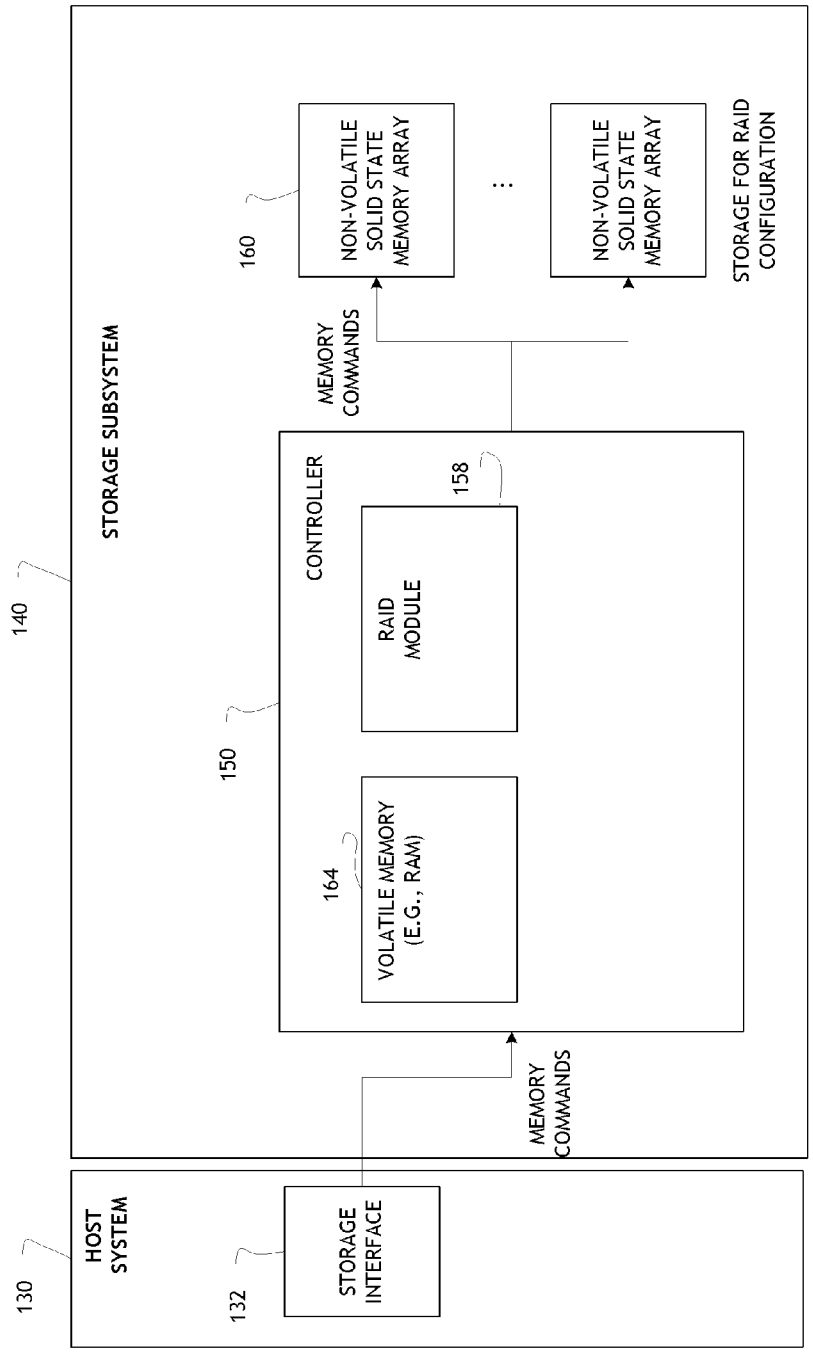
FIG. 1 is a block diagram illustrating a storage subsystem implementing a data redundancy scheme with a mechanism for storing metadata with parity data to enhance data recovery according to one embodiment.

FIG. 1 is a block diagram illustrating a storage subsystem with a mechanism for storing metadata with parity data to enhance data recovery. As shown, a storage subsystem 140 includes a controller 150 and one or more non-volatile solid-state memory arrays 160. The arrays 160 may comprise a plurality of solid-state storage devices coupled to the controller 150. The arrays may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

The controller 150 in one embodiment in turn includes a RAID module 158 and a volatile memory 164, which may be implemented in, for example, RAM such as a DRAM or SRAM. The controller may alternatively be implemented in-whole or in-part as an ASIC, FPGA, or other device, which may but need not execute firmware. In another embodiment, the volatile memory 164 is outside of the controller 150 in the storage subsystem 140. In one embodiment, the RAID module 158 is configured to execute data access commands to maintain a data redundancy scheme in the storage subsystem. For example, the RAID module 158 may maintain data on which storage elements are assigned to which RAID stripes and determine how data are arranged in the data redundancy scheme (e.g., grouped into stripes with parity). In another embodiment, the various processes described herein may be executed by the RAID module 158 within the controller 150, by one or more components within the controller 150, or by a combination of both.

In one embodiment, the controller 150 of the storage subsystem 140 is configured to receive and execute commands from a storage interface 132 in a host system 130. The memory commands from the storage interface 132 may include write and read commands issued by the host system 130. As further shown in FIG. 1, in one embodiment, the controller 150 executes the received commands in one or more non-volatile solid-state memory arrays 160. As will be explained below, in one embodiment, the volatile memory 164 is configured to temporarily hold parity data for data stripes (e.g., RAID stripes) that are yet to be completed/closed. In one embodiment, when a stripe is complete (e.g., all pages of a stripe are programmed in the non-volatile memory arrays 160), the parity data is then transferred to the non-volatile memory arrays 160. The volatile memory 164 may also be configured to temporarily hold "user" data to be written to the memory arrays 160, and such user data may include data received from the host system 130 and/or other data related to internal storage subsystem operations such as garbage collection and wear leveling. In one embodiment, the user data may be held in a separate volatile memory than that which is used to hold the parity data, or in a different portion of the volatile memory 164 than that which is used for the parity data. The controller 150 may also execute internal memory commands such as those needed for garbage collection and wear leveling, etc. and write data related to those internal memory commands to the non-volatile solid-state memory arrays 160 (via the volatile memory or directly to the memory arrays).

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

Parity Handling Process

Figure 2:
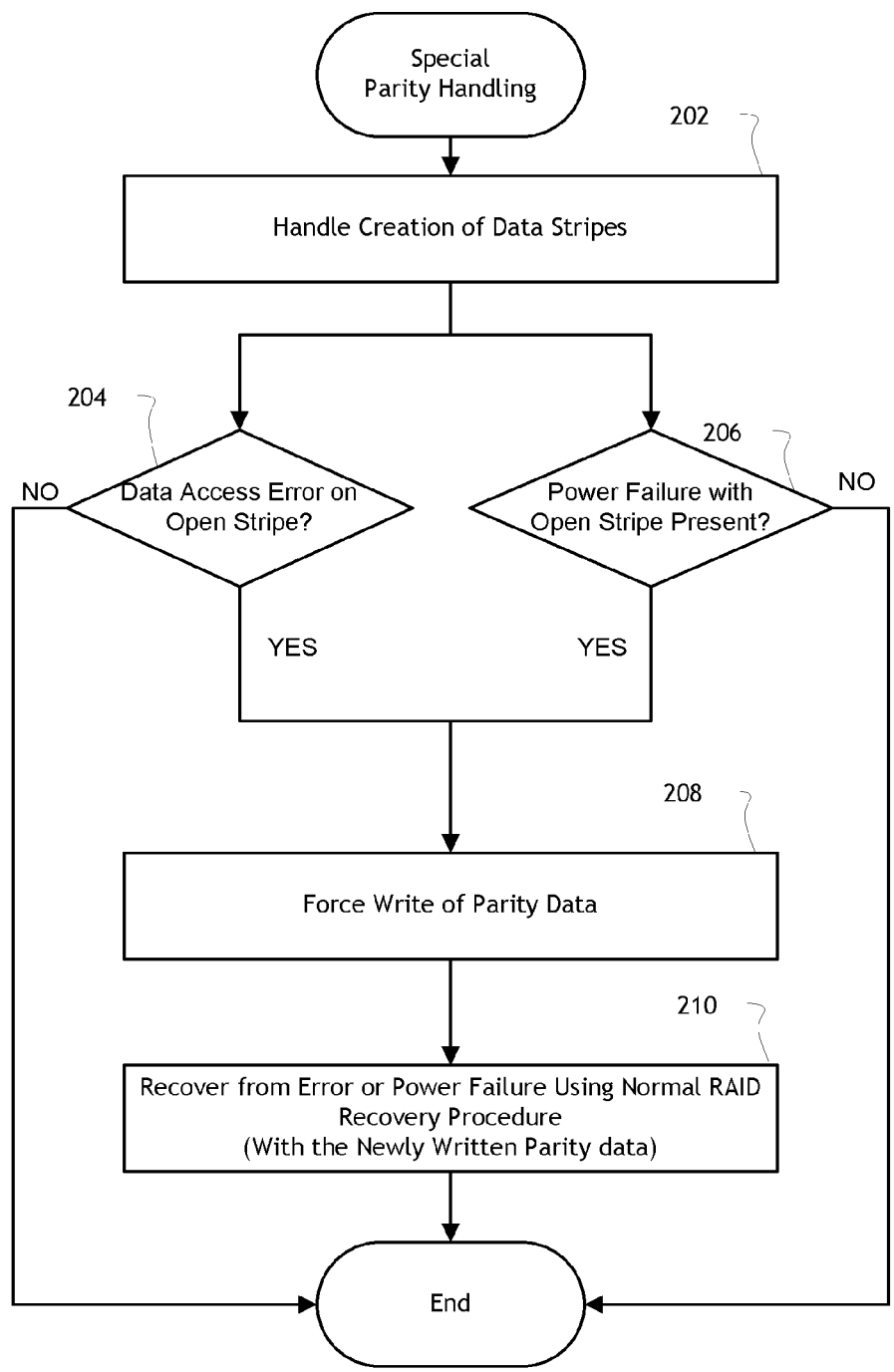
FIG. 2 is a flow diagram showing a process of handling parity data according to one embodiment.

FIG. 2 is a flow diagram showing a process of handling parity data according to one embodiment. In block 202, the controller 150 handles the creation of data stripes as data is received from the host (or via internal commands such as garbage collection). At the same time, the controller may be processing read commands on data stripes that have already been written to the non-volatile memory array. Blocks 204 and 206 illustrate two example conditions under which parity for a partial stripe may be written to the non-volatile memory. In block 204, it is determined whether an uncorrectable error (e.g., uncorrectable by ECC) has occurred as a result of a read operation on an open stripe (i.e., a data stripe that has not been completely written to the non-volatile memory array and for which parity data has not been written to the non-volatile memory array). In one embodiment, the controller employs an ECC (error-correcting code) mechanism to attempt to correct any reading error, but the error is deemed uncorrectable if the ECC mechanism cannot correct it. Note that if the error is correctable, the condition is not met in block 204 and there is no need to force an early write of the parity data. Although an ECC read error example is described here, the same process is applicable to a program error as well. If an uncorrectable data access error has occurred, the controller would force a write of parity data for that open stripe (block 208). In one embodiment, this means that the parity data (for the open stripe) that is currently held in the volatile memory is written to the non-volatile memory array.

In block 206, the controller may also determine whether there is a power failure event occurring with an open stripe present. If so, the parity data for the open stripe is written to the non-volatile memory as part of the power failure handling process (block 208). In either case, the controller in block 210 may execute a recovery process using the newly written parity data. In one embodiment where RAID is implemented, the process is a standard RAID data recovery procedure. Although not shown, there are other situations besides those illustrated in blocks 204 and 206 where the controller may write the parity for an open stripe. For example, certain data transfer interface standards support a Force Unit Access (F.U.A.) command, which may require an immediate write to the non-volatile memory and trigger a corresponding writing of parity data.

Partial Stripe with Forced Parity Write Example

Figure 3A:
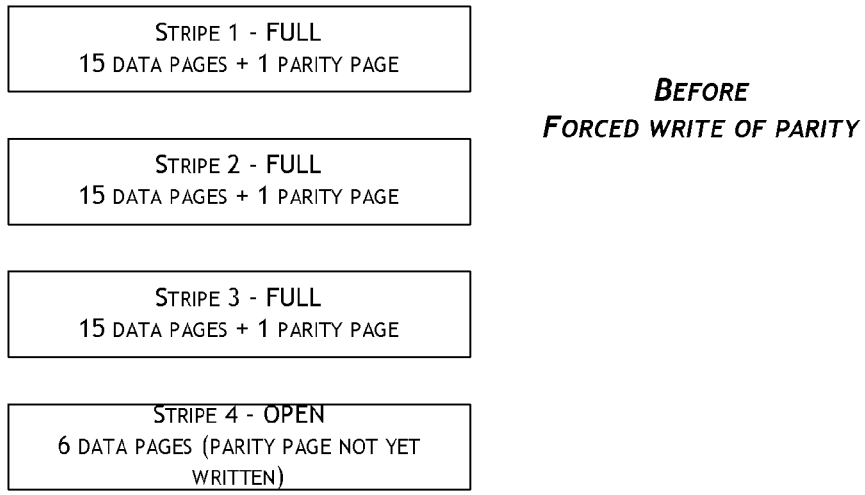
FIGS. 3A-3B illustrate an example of a partial data stripe according to one embodiment.
Figure 3B:
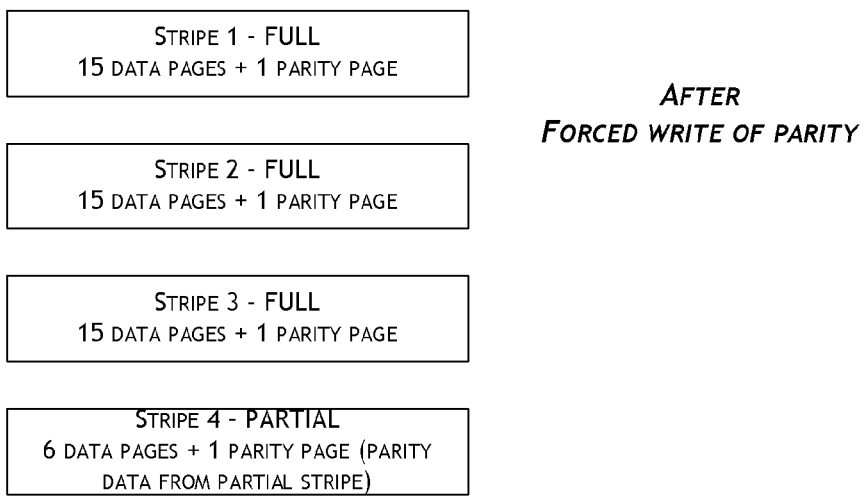

FIGS. 3A-3B illustrate an example of a partial data stripe according to one embodiment. FIG. 3A shows four example stripes (Stripes 1-4). Stripes 1-3 are all full stripes in the sense that each has 15 data pages covered by one parity page. Stripes 1-3 have all been written to the non-volatile memory array. These three stripes represent stripes created under normal operation in which no uncorrectable (e.g., uncorrectable by ECC) data errors or a power failure were detected in the process of stripe creation. In one embodiment, for these completed stripes with parity already written, any error not corrected by ECC can be corrected by using the normal RAID recovery procedure using the parity data. The fourth stripe, Stripe 4, is an open stripe, since it has only 6 pages written to the non-volatile memory array, and the parity data held in the volatile memory is not yet written to the non-volatile memory since parity in this example is typically written after the 15th page is written to the non-volatile memory.

FIG. 3B shows the state of the non-volatile memory after the forced write of the parity data. The process shown in FIG. 3B may be performed in whole or in part by the controller shown in FIG. 1, or by a component of the controller such as the RAID module. As previously shown in FIG. 2, the forced write of parity data occurs: (1) when an uncorrectable data access error is encountered in one of the pages in an open stripe for which parity data has not been written, (2) when a power failure event is detected while there is an open stripe, or (3) when some other condition occurs that necessitates an early write of the parity data.

In this example, an uncorrectable ECC error occurred while a read was being performed on one of the six pages in Stripe 4, prompting the writing of the parity data to the non-volatile memory ahead of its scheduled write time. The result, as shown in FIG. 3B, is that Stripe 4 is now a partial stripe within the non-volatile memory, and recovery from that uncorrectable data error proceeds with the partial parity data that was written. In one embodiment, after the storage subsystem recovers from that data access error through the use of parity data, the subsystem may move on to create other data stripes, leaving Stripe 4 as a partial stripe. In one embodiment, the data recovery may additional use the meta data written with the parity data, as described below.

Parity Marking

Figure 4A:
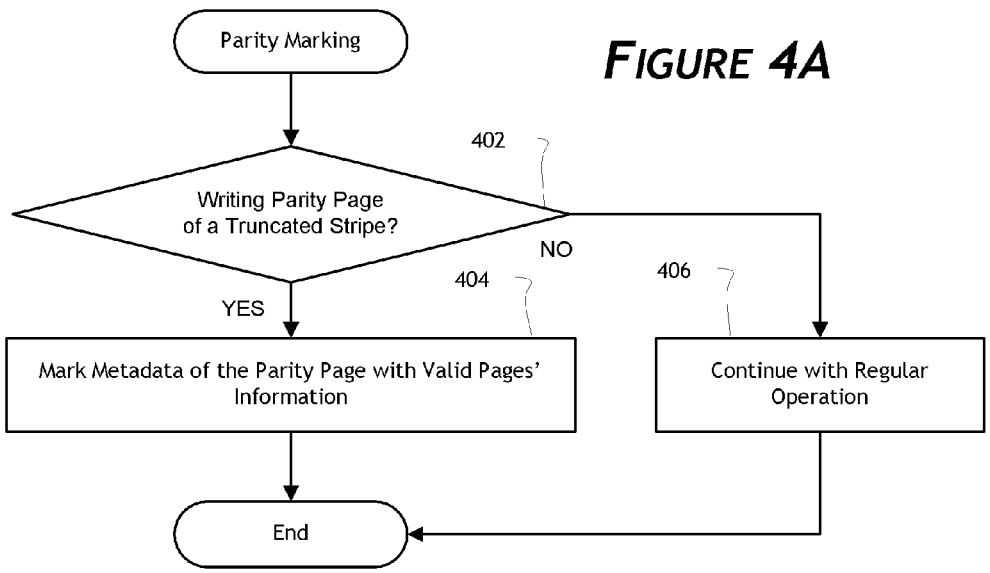
FIG. 4A is a flow diagram showing a process of parity marking according to one embodiment

While FIG. 3B shows an example of writing parity data for a partial stripe, in various embodiments additional data is written along with the parity data for a partial stripe to "mark" the parity data. FIG. 4A is a flow diagram showing a process of parity marking according to one embodiment. In block 402, it is determined whether the current write operation is writing a parity page of a truncated stripe (partial stripe). If so, in block 404, the spare/metadata area of the parity page is marked with information concerning which of the pages in the associated stripe are valid. As shown in the figure, a parity page for a regular (non-truncated) stripe would not have metadata on valid pages information (since presumably all pages are valid).

Figure 4B:
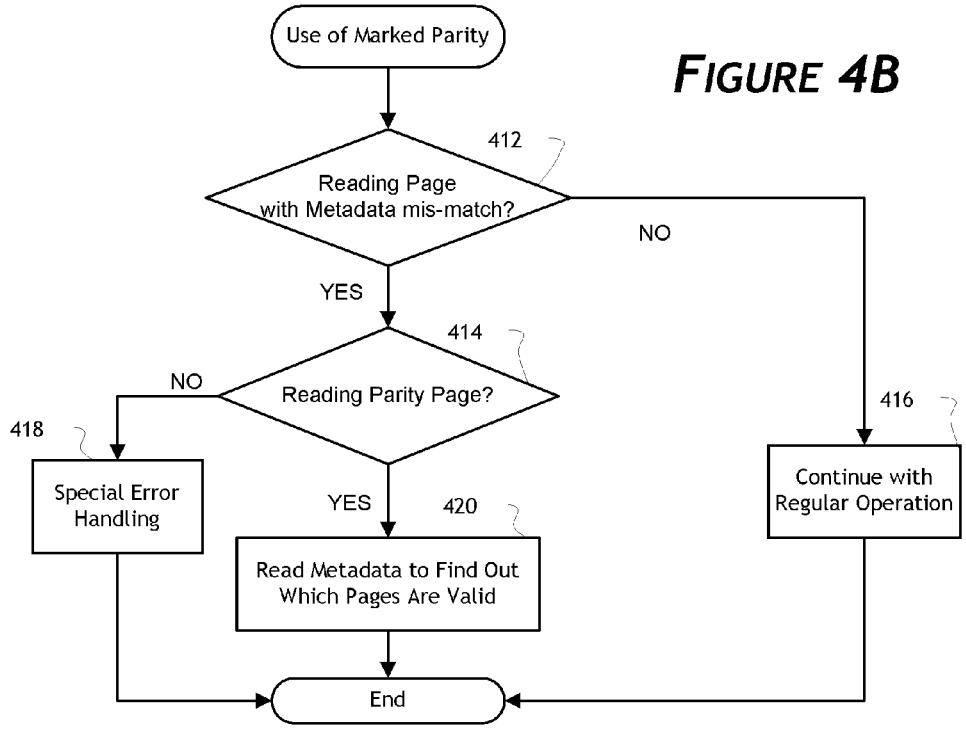
FIG. 4B is a flow diagram showing a process of using marked parity according to one embodiment.

FIG. 4B is a flow diagram showing a process of using marked parity according to one embodiment. In block 412, the controller determines whether it is reading a page with metadata mismatch. If not, this indicates that the controller is reading a user data page, and the controller would continue with regular operation (block 416). If it is determined that the there is a metadata mismatch, the expected result is that the controller is reading a parity page for a partial stripe. However, if it is determined in block 414 that it is not reading a parity page, the controller would initiate special error handling in block 418. Otherwise, in block 420, the controller reads the metadata to find out which pages in the associated stripe are valid. In a RAID based embodiment, for example, the valid pages and parity are XOR'ed to generate data in a recovery process.

Figure 5:
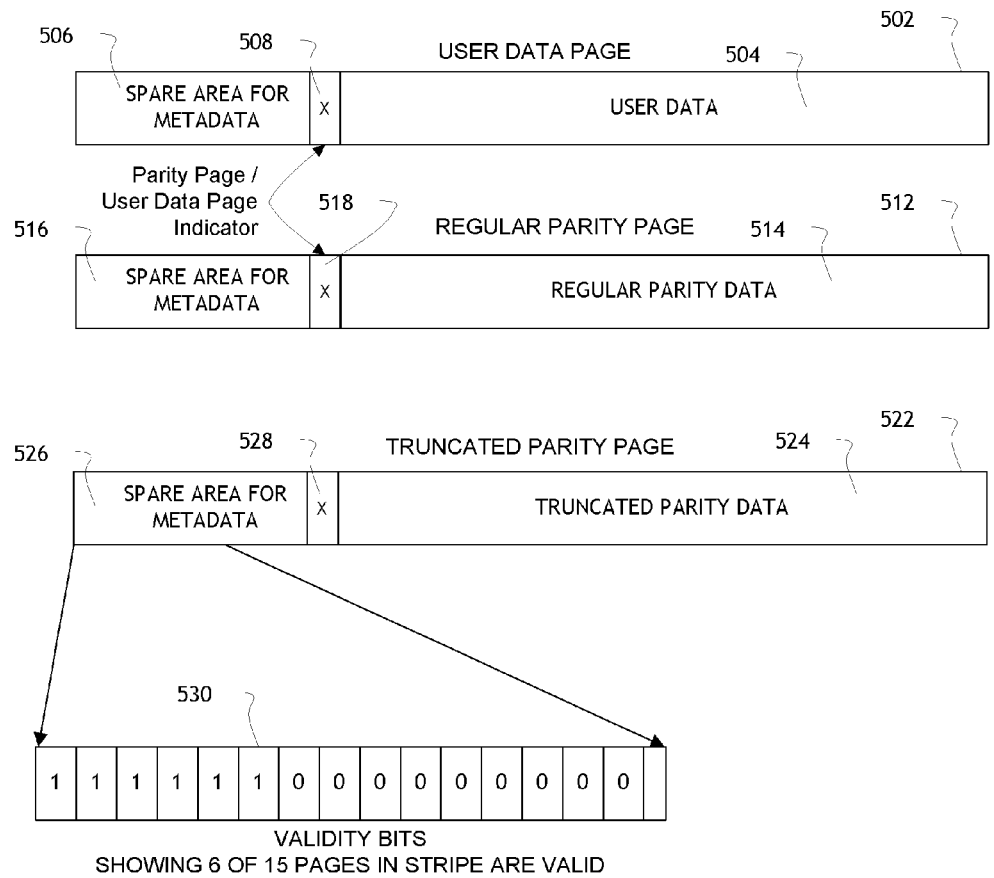
FIG. 5 is block diagram showing an example of writing additional metadata with parity data according to one embodiment.

FIG. 5 is block diagram showing an example of writing additional metadata with parity data according to one embodiment. In one embodiment, each page, whether it is used for storing user data or parity data, includes a spare area for metadata. The spare area may include metadata such as that used for ECC purposes or another system data. In addition, in one embodiment, each page includes within its spare area an indication that it is either a user data page or a parity page (indicators 508 and 518). The indicator is used, for example, by the process depicted in FIG. 4B to indicate to a controller reading the page whether the page contains user data or parity data. As shown, a user data page 502 includes both a user data area 504 and a spare area 506. Similarly, a regular parity data page 512 includes both a regular parity data area 514 and a spare area 516.

FIG. 5 also shows a truncated parity page 522 including truncated parity data 524 and a spare area for metadata 526. The metadata includes an indicator 528 indicating that this is a parity page. In addition, the example truncated parity page 522 includes validity bits 530 within the spare area 526. In this example, the validity bits show that six of the 15 pages of the associated stripe contain valid data. Thus, if a recovery process needs to be executed to recover the data on that partial stripe, the validity bits can indicate which of pages in the stripe are valid, and the controller can thus handle this partial stripe accordingly.

Use of Metadata

In one embodiment, with the metadata in place, once a partial stripe is written with parity it does not need to be moved to a new location until the controller needs to execute a data relocation operation such as garbage collection. This is because the metadata allows the controller to detect the presence of a partial stripe and provides information to the controller to help it decipher which of the pages within the partial stripe are valid. The elimination of the need to further process the partial stripe once written (e.g., by re-writing the partial strip into a full stripe) saves time and thus does not introduce additional write amplification (additional write operations to accommodate write commands issued by a host system). By storing the metadata in the spare data area of a page, most of the time the controller can execute read/write operations on regular stripes normally without having to incur the additional penalty of looking up and check to see if the stripe is truncated. In one embodiment, as shown in FIG. 4B, the additional work is incurred only when a metadata mismatch is encountered in the course of normal reading operations.

In one embodiment, with the afore-mentioned truncated stripe marking, the hardware can detect the marking and report back to firmware for special handling during a garbage collection read operation. Therefore, the normal read operation performance is not affected. The marking will indicate to the garbage collection process which pages are valid in a truncated stripe should an error arises. In one embodiment, the parity page is the last page in a stripe by default, which simplifies both normal read and write operations as well as defect management. The truncated page will be detected and handled accordingly.

Figure 6:
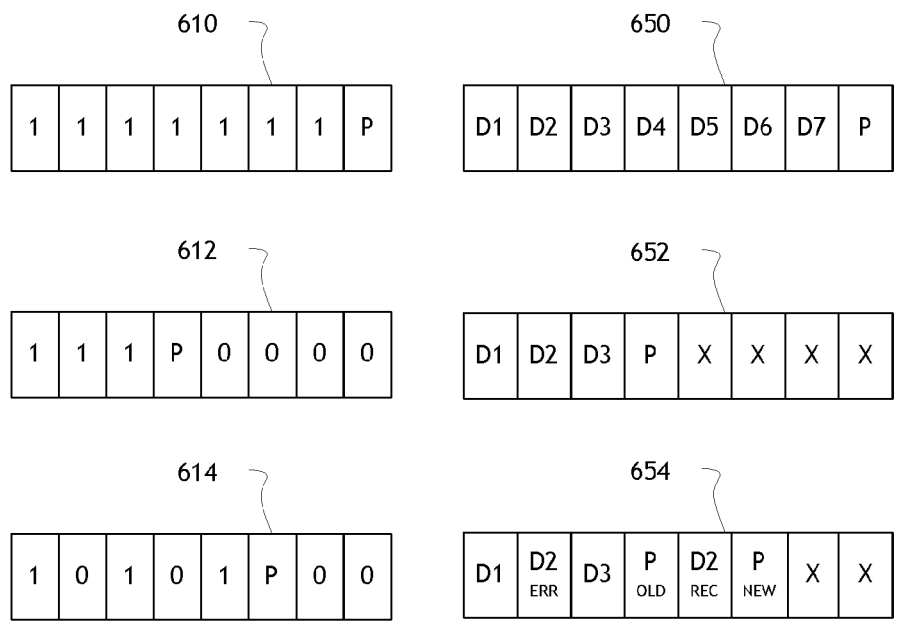
FIG. 6 is block diagram showing an example of using metadata for data recovery according to one embodiment.

FIG. 6 illustrates an example data recovery process that uses metadata. The figure illustrates a series of pairings of metadata (610, 612, and 614) with the corresponding data stripe in the non-volatile memory (650, 652, and 654). Stripe 650 shows a normal stripe with seven user data pages (D1-D7) associated with one parity page (P). Metadata 610 for stripe 650 shows a "1" bit for each of the valid pages D1-D7 and an indicator "P" for the parity page. Stripe 652, on the other hand, depicts a partial stripe created by an early write of parity data as described above. Stripe 652 includes three valid data pages (D1-D3) followed by a parity page (P). The rest of the pages in stripe 652 are not valid as indicated by the markings "X." As such, metadata 612 for stripe 652 indicates the validity of the pages D1-D3 ("1"), the parity page location ("P"), and those pages that do not have valid data ("0").

Stripe 654 illustrates the result of a data recovery caused by a data access error on page D2 of stripe 652. The controller, upon encountering such an error, used the parity and data from pages D1 and D3 to recover D2. As shown, the recovered D2 is written after the parity page, as indicated by the label "D2 REC." Accordingly, metadata 612 is updated (shown by metadata 614) to reflect the fact that the old D2 page is no longer valid (shown by a "0" bit in the second position) and that the valid D2 page is now after the old parity page (shown by a "1" bit in the fifth position). Note that metadata 614 also reflects the location of the new parity page for the stripe.

The updated metadata enables the controller to track the locations of the valid pages. Thus, for example, if a data access error occurs on D3, the controller will need to read the parity page and pages D1 and D2 to recover D3. The updated metadata 614 may serve as a bit mask to point the controller to the right location of the valid D2 page (which is in the fifth position rather than in the second position as originally written) as well as the new parity page. This enables the controller to quickly locate the needed data to recover D3.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 2, 4A, and 4B may differ from those shown in the figures. Depending on the embodiment, certain of the steps described in the example above may be removed, others may be added, and the sequence of steps may be altered and/or performed in parallel. Although this disclosure describes examples in which data are stored in units of pages, those skilled in the art will recognize that the various embodiments disclosed are applicable to systems with other memory measurement units such as blocks, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A solid-state storage subsystem comprising:
a non-volatile memory array;

a controller configured to implement a data redundancy configuration with a plurality of data stripes in the non-volatile memory array, wherein each of the plurality of data stripes is of a pre-defined stripe size comprising a pre-defined number of data elements and wherein the controller is configured to write parity data to the non-volatile memory array for a data stripe in the non-volatile memory array that has reached the pre-defined strip size; and a volatile memory for temporarily storing:
data to be written to the non-volatile memory array; and
parity data associated with partial data stripes in the non-volatile memory that have not yet reached the pre-defined stripe size;

wherein the controller is further configured to:
detect (1) an occurrence of a data access error in one of the plurality of data stripes for which parity data has not been written to the non-volatile memory array or (2) a power failure of the solid-state storage subsystem; and in response to detecting the occurrence of data access error or power failure, write to the non-volatile memory array (1) metadata indicating validity of one or more data elements in a partial data stripe associated with the parity data and (2) the parity data for the partial data stripe, whereby the metadata enables a delay of a re-writing of the partial data stripe into a full data stripe of the pre-defined size.

2. The solid-state storage subsystem of claim 1, wherein the controller is further configured to use the metadata in a data relocation operation to determine which of the data elements in the partial data stripe are valid.

3. The solid-state storage subsystem of claim 1, wherein the controller is further configured to use the metadata in a data recovery operation triggered by an uncorrectable ECC error.

4. The solid-state storage subsystem of claim 1, wherein the non-volatile memory array comprises a plurality of pages, and wherein each page comprises a data area and a spare area.

5. The solid-state storage subsystem of claim 4, wherein the parity data is written to the data area and the metadata is written to the spare area.

6. The solid-state storage subsystem of claim 5, wherein the controller is further configured to read metadata from the spare area of a page to determine if the data area of the page contains parity data.

7. The solid-state storage subsystem of claim 1, wherein the data redundancy configuration is a redundant array of independent disks (RAID) configuration.

8. A method of recovering from a data access error in a solid-state storage subsystem, the method comprising:
implementing a data redundancy configuration with a plurality of data stripes in a non-volatile memory array of the solid-state storage subsystem, wherein each of the plurality of data stripes is of a pre-defined stripe size comprising a pre-defined number of data elements;

temporarily storing, in a volatile memory of the solid-state storage subsystem, data to be written to the non-volatile memory array and parity data associated with partial data stripes in the non-volatile memory that have not yet reached the pre-defined stripe size;

detecting (1) an occurrence of a data access error in one of the plurality of data stripes for which parity data has not been written to the non-volatile memory array or (2) a power failure of the solid-state storage subsystem; and in response to detecting the occurrence of data access error or power failure, writing to the non-volatile memory (1) metadata indicating validity of one or more data elements in a partial data stripe associated with the parity data and (2) the parity data for the partial data stripe.

9. The method of claim 8, further comprising:
using the metadata in a data relocation operation to determine which of the data elements in the partial data stripe are valid.

10. The method of claim 8, further comprising:
using the metadata in a data recovery operation triggered by an uncorrectable ECC error.

11. The method of claim 8, wherein the non-volatile memory array comprises a plurality of pages, and wherein each page comprises a data area and a spare area.

12. The method of claim 11, wherein the parity data is written to the data area of a page and the metadata is written to the spare area of the page.

13. The method of claim 12, further comprising:
reading metadata from the spare area of a page to determine if the data area of the page contains parity data.

14. The method of claim 8, wherein the data redundancy configuration is a redundant array of independent disks (RAID) configuration.

15. A solid-state storage subsystem, comprising:
a non-volatile memory array; and
a controller configured to implement a data redundancy configuration with a plurality of data stripes in the non-volatile memory array, the controller configured to respond to at least one type of failure event by creating a partial data stripe that contains (1) metadata that specifies which of data elements of the partial data stripe are valid, (2) parity data, and (3) both valid and invalid data elements, the controller further configured to use the metadata to determine which data elements of the partial data stripe are valid.

16. The solid-state storage subsystem of claim 15, wherein the at least one type of failure event includes a power failure event.

17. The solid-state storage subsystem of claim 15, wherein the at least one type of failure event includes a data access error from a data operation on the non-volatile memory array.

18. The solid-state storage subsystem of claim 17, wherein the controller is further configured to use the parity data and metadata to recover from the data access error.

19. The solid-state storage subsystem of claim 17, wherein the data operation is a read error or a program error.

20. The solid-state storage subsystem of claim 15, wherein the data redundancy configuration is a redundant array of independent disks (RAID) configuration.

21. The solid-state storage subsystem of claim 15, further comprising:
a volatile memory for temporarily storing the parity data prior to the failure event,
wherein the controller is further configured to use the parity data stored in the volatile memory in the creation of the partial data stripe.

* * * * *